Feb. 4, 1969    E. F. HEISER    3,425,257
FORMING APPARATUS AND FLUID SPRING THEREIN
Filed March 3, 1966

INVENTOR
ELMER F. HEISER
BY
Hoffmann and Yount
ATTORNEYS

United States Patent Office 3,425,257
Patented Feb. 4, 1969

3,425,257
FORMING APPARATUS AND FLUID SPRING
THEREIN
Elmer F. Heiser, 5880 Lotusdale Drive,
Parma Heights, Ohio 44129
Filed Mar. 3, 1966, Ser. No. 531,555
U.S. Cl. 72—297　　　　　　　　　　　　16 Claims
Int. Cl. B21d 11/04, 22/20, 24/02

ABSTRACT OF THE DISCLOSURE

In a sheet metal forming press having piston-and-cylinder fluid springs, a separate seat member on the outer end of each piston rod has a flat lower face for flush engagement with the adjacent face of a workpiece-forming member in the press. A ball-and-socket, thrust-sustaining joint is provided between this seat member and the piston rod. A rubber sleeve encircles this joint and holds the seat member assembled to the piston rod.

This invention relates to a workpiece forming apparatus, such as a sheet metal forming press, and to a fluid spring for use in such an apparatus.

Prior to the present invention, various cylinder-and-piston fluid springs have been embodied in sheet metal forming presses for the purpose of yieldably opposing relative movement between workpiece-engaging members in the press, such as workholder members and die members. One problem encountered in the use of such fluid springs is that any misalignment in the press itself or in the mounting of the fluid spring in the press causes detrimental side loading on the cylinder by the piston. Self-aligning pistons have been used to minimize effects of misalignment. However, in the case of both nonself-aligning and self-aligning pistons, it is desirable that the outer end of the piston rod be free to move angularly relative to the member engaged thereby. Conventionally, the outer end of the piston rod has been rounded and in one type of construction has engaged a flat surface on the die member. This, however, provides, at least initially, substantially a point contact and concentrates the forces transmitted between the piston rod and the die member and requires hardening of the die member. In another conventional construction the outer end of the piston rod had been received in a conical seat which initially provides a line contact between the outer end of the piston rod and the die member to increase the extent of the force-transmitting engagement between the die member and piston member or the piston rod. Here again, the limited engagement has made it necessary to harden the die member.

One additional problem with providing a seat in the die member is that it requires a machining operation which must be precisely accomplished in order to align the seat with the axis of the fluid spring so as not to introduce detrimental side-loading forces on the piston rod. In practice, it is not unusual for the machining to be out of alignment in final assembly.

The present invention is directed to a novel arrangement which overcomes these difficulties and advantages and which does not require hardening or machining of the die member.

A principal object of the present invention, therefore, is to provide a new and improved die cushion comprising a piston and cylinder in which the outer end of the piston rod carries a hardened seat member which eliminates the need for hardening or machining the die member engaged thereby to accommodate the forces transmitted by the spring.

The invention resides in certain constructions, combinations, and arrangements of parts; and further objects and advantages of the invention will be apparent to those skilled in the art to which the invention relates from the following description of certain preferred embodiments, described with reference to the accompanying drawing forming a part of this specification, and in which.

Figure 1:
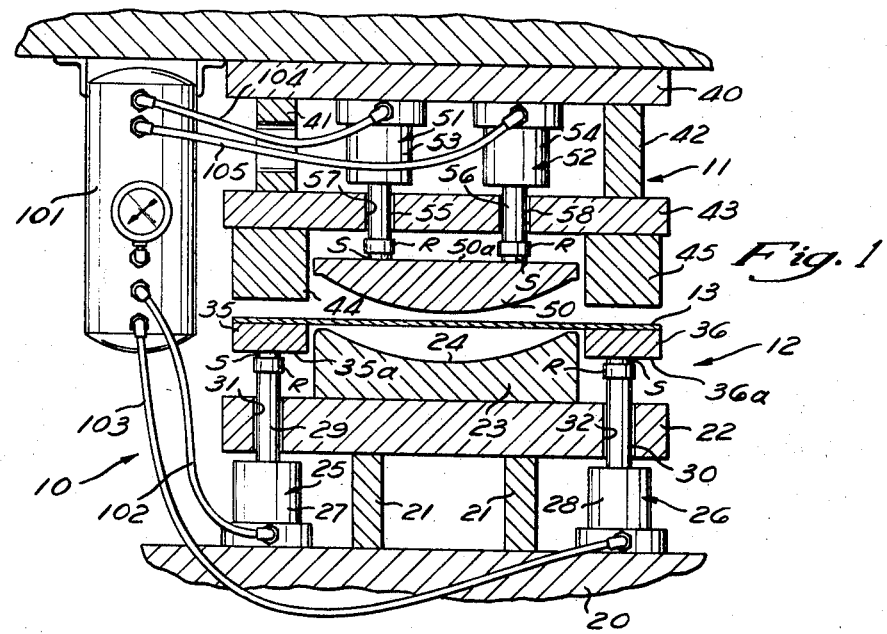
FIGURE 1 is a cross-sectional view illustrating a sheet metal forming press embodying the present invention.

For a better understanding of a typical use to which it may be put, the present invention is shown embodied in a sheet metal forming press 10 (FIG. 1) which has cooperating die means which, upon relative movement, shape or form the sheet material positioned therebetween. The fluid spring of the present invention functions to cushion or yieldably resist relative movement between workpiece-engaging members of the press during the forming of the workpiece for a well known purpose. Referring to FIG. 1, this sheet metal forming press 10 includes upper die means 11 and lower die means 12 which cooperate to effect the forming of a sheet metal workpiece 13 positioned therebetween. The press 10 also includes suitable power mechanism to effect relative movement between the upper die means 11 and the lower die means 12 so as to cause the die means 11, 12 to cooperate to form the workpiece 13. This mechanism may be of any conventional construction and is not shown herein, nor will it be described.

The lower die means 12 includes a horizontally extending support die member 20 connected by suitable vertically extending spaced rib members 21 to a horizontal support member 22. A lower workpiece-forming die member 23 is carried by the support member 22 centrally thereof and has a concave recess 24 in the upper surface thereof into which the material of the workpiece is formed by the upper die means 11, as will be described in detail hereinbelow.

The lower die means 12 also includes fluid spring means comprising a pair of fluid springs 25 and 26 supported at spaced locations by the support member 20. The fluid springs 25, 26 include respective cylinders 27, 28 attached to the support member 20 and pistons slidable in these cylinders and having piston rods 29, 30, respectively, which extend outwardly of the cylinders 27, 28 and through suitable openings 31, 32, respectively, in the support member 22.

A pair of workpiece-engaging members in the form of workholder members 35 and 36 are located respectively on opposite sides of the die member 23 and are supported by the piston rods 29, 30. In accordance with the present invention, seat members S are interposed between the outer ends of the piston rods 29, 30 and the workholder members 35, 36. Each seat member is coupled to the outer end of the respective piston rod so as to provide self-adjusting universal swivel movement between them, as explained in detail hereinafter. The workholder members 35, 36 are biased upward and normally held by the fluid springs 25 and 26 in the position shown in FIG. 1, extending above the uppermost portion of the die member 23. The piston rods 29 and 30 are mechanically free of the workholder members 35 and 36.

The upper die member 11 includes a suitable support member 40 connecter by support rib members 41 and 42 extending from the support member 40 to a horizontally extending support member 43 spaced below the support member 40. The support member 43 has a pair of laterally spaced, workpiece-engaging members 44, 45, respectively, which are of substantially the same horizontal dimension as the workholder members 35, 36 and function to clamp the workpiece 13 down against the workholder members 35, 36 upon relative movement between the upper die means 11 and the lower die means 12. The upper die means 11 also includes a workpiece-engaging member in the form of a die member 50, which is positioned between the members 44 and 45 and is normally suspended by a conventional arrangement (not shown) in the position shown in FIG. 1 so as to trial the movement of the members 44, 45.

The die member 50 is associated with a pair of fluid springs 51, 52 which have respective cylinders 53, 54 secured to the support member 40 and pistons reciprocable in these cylinders. The pistons have respective piston rods 55, 56 extending from the cylinders down through openings 57, 58 respectively, in the horizontally extending support member 43. Respective seat members S are interposed between the outer ends of the piston rods 55, 56 and the top of die member 50. Each seat member S is coupled to the outer end of the respective piston rod so as to provide self-adjusting universal swivel movement between the seat member and the piston rod, as explained hereinafter. The fluid springs 51, 52 bias the die member 50 downward to the position shown in FIG. 1. The piston rods 55, 56 are mechanically free of the die member 50.

Upon relative movement between the upper and lower die means 11, 12, the workpiece-engaging members 44, 45 move downwardly and engage the side portions of the workpiece 13 and clamp the workpiece down against the workholder members 35, 36, respectively. Continued movement of the upper die member 11 causes the workpiece-engaging members 44, 35 and 45, 36 to move downwardly against the biasing force of the fluid springs 25, 26, causing the lateral surface edge of the workpiece 13 to be bent downwardly. The fluid springs 25, 26 yieldably resist with a substantially constant force the movement of the workholder members 35, 36 relative to the support member 20 and the die member 23.

As the upper die means 11 continues to move downwardly relative to the lower die means 12, the die member 50 engages the workpiece 13 centrally thereof, and further downward movement of the die member 50 causes the sheet material of the workpiece 13 to be moved down into the recess 24 of the lower die member 23. The fluid springs 51 and 52 will yield as the resisting force of the workpiece increases during drawing, so that the die member 50 engages the workpiece with a substantially uniform force during the work stroke.

As already mentioned, in the operation of the press, the fluid springs 25, 26 yieldably resist movement of the respective workholder members 35 and 36 with respect to the lower die member 23 and the fluid springs 51 and 52 resist movement of the upper die member 50 with respect to members 44 and 45, to provide substantially constant drawing forces as the upper support member moves downwardly, and the fluid springs bias these members to the position shown in FIG. 1. The resisting or biasing force in each fluid spring is provided by a fluid, preferably a gas, in the cylinder acting against the piston therein to oppose movement of the piston rod into the cylinder. In one preferred embodiment, the pressure fluid is nitrogen supplied from a reservoir tank 101 through respective hoses 102, 103, 104 and 105 leading to the fluid springs.

As shown in FIG. 1, the bottom face 35a of the workholder member 35 constitutes a flat abutment surface which is disposed substantially perpendicular to the straight line path of movement of member 35. This is also true of the bottom face 36a of workholder member 36, and of the top face 50a of die member 50.

The following description refers specifically to the coaction between the flat abutment surface 50a on die member 50 and the piston rod 56 of fluid spring 52 and the seat member S on the outer end of this piston rod. However, it is to be understood that the same physical relationship and coaction is present at each of the other fluid springs.

Figure 2:
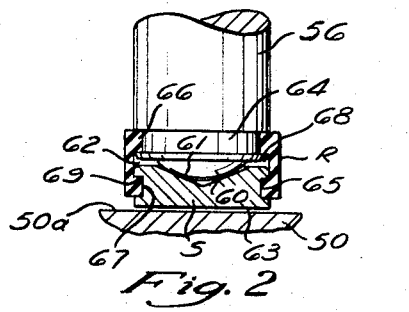
FIGURE 2 is a view, partly in elevation and partly in longitudinal section, showing the self-aligning outer end of a fluid spring in the FIG. 1 apparatus in accordance with a first embodiment of this invention.

Referring to FIG. 2, in accordance with one embodiment of the present invention the outer (lower) end face of piston rod 56 presents a generally spherical, ball-shaped projection 60. The seat member S has a generally conical depression or socket 61 in its inner (upper) end face engages the ball-shaped projection 60 to provide a ball-and-socket joint between the outer end of the piston rod and the seat member S. At the lateral periphery of this ball-and-socket joint there is an axial clearance or gap 62 between the outer end of the piston rod and the inner end of the seat member, so that the seat member is capable of universal angular or swivel movement on the outer end of the piston rod, to the extent permitted by this clearance. The outer (lower) end face 63 of seat member S is a flat surface which is in confronting relationship to the flat abutment surface 50a on die member 50. The area of this end face 63 is substantially equal to the cross-sectional area of the piston rod 56 and is sufficiently large to avoid an excessively high pressure on the abutment surface 50a where it engages the latter. Preferably, the seat member S is of suitable hardened metal.

Close to its outer end the piston rod 56 has an external, circumferential groove 64. At this groove the piston rod presents an external annular shoulder 68, which faces away from the seat member S. The seat member S has a similar groove 65 midway along its axial extent. At this groove the seat member S presents an external annular shoulder 69, which faces away from the piston rod. The seat member S is detachably held on the outer end of the piston rod by an annular, sleeve-like, internally flanged, deformable and resilient retainer member R of rubber-like material.

Figure 3:
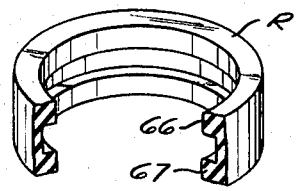
FIGURE 3 is a perspective view broken away for clarity, showing the retainer member in the FIG. 2 assembly.

As shown in FIGS. 2 and 3, this retainer member has a pair of inwardly projecting annular flanges 66 and 67, which are respectively seated snugly in the grooves 64 and 65, abutting against the respective shoulders 68 and 69 on the piston rod 56 and the seat member S. The retainer member is stretched radially at these flanges to snugly grip the piston rod and the seat member. The retainer member also is stretched axially by the engagement of its flanges 66 and 67 against the oppositely facing shoulders 68 and 69 on the piston rod and the seat member at these grooves, so that it holds the socket 61 on the seat member S frictionally against the ball-shaped protrusion 60 on the outer end of the piston rod so as to yieldably resist angular or swivel movement of the seat member with respect to the piston rod. The retainer member may be manually attached to, and removed from, both the seat member and the piston rod by stretching it.

During operation, the retainer member R is yieldable to permit universal angular or swivel movement between the piston rod and the seat member S. The ability of the piston rod to swivel in the seat will lessen side loading effects due to misalignment of the press or the cylinder. Moreover, the seat member may swivel to accommodate itself to the surface of the die member even though the surface is not precisely perpendicular to the axis of the piston rod. Because of the large area of the outer end face of the seat member, the forces acting between the die member and fluid spring are distributed over a relatively large area. Moreover, the retainer R facilitates assembly of the fluid spring into the press since the seat is always maintained in its proper position on the end of the piston rod.

This novel self-aligning construction in the present fluid spring completely eliminates the necessity of providing on the abutment surface 53a of die member 50 a seat or depression for engagement by the outer end of the piston rod and the attendant difficulty and expense of locating such a seat in precise alignment with the piston rod. Also, because end face 63 of the fluid spring which engages the abutment surface 50a has a relatively large area, it is not necessary to specially machine or harden the abutment surface to withstand the pressure of such engagement.

The retainer member R constitutes a seal around the ball-and-socket joint which prevents the entry of dirt or other undesired foreign matter which might interfere with its operation.

It will be understood that the same ball-and-socket joint is provided between each of the other piston rods 55, 29 and 30 and the respective seat member S in the press of FIG. 1, and that an identical retainer member R is provided at each ball-and-socket joint, for the purpose already explained in detail.

Figure 4:
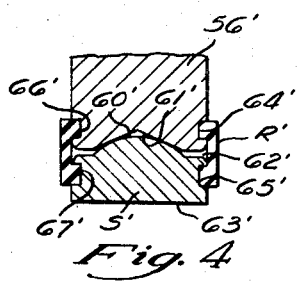
FIGURE 4 is a longitudinal sectional view of the self-aligning outer end of a fluid spring in accordance with a second embodiment of this invention.

FIGURE 4 shows a second embodiment of the thrust-transmitting universal joint in the present invention. This arrangement is identical to that of FIG. 2, except that the ball-and-socket parts of the joint are reversed, the ball being on the inner end of the seat member and the socket or recess being on the outer end of the piston rod. The elements corresponding to those in FIG. 2 are given the same reference numerals with a "prime" subscript added. A detailed description of this embodiment is omitted as unnecessary since the mode of operation is essentially the same as for the embodiment of FIG. 2, already described in detail.

While preferred embodiments of the present invention have been described hereinabove in considerable detail with reference to a particular press in which the invention may be embodied, it is to be understood that the invention is susceptible of other uses and is not limited to the particular consrtuctions shown, and it is my intention to cover hereby all adaptations, modifications and uses thereof which come within the scope of the appended claims.

Having described my invention, I claim:

1. In an apparatus for forming a workpiece, the combination of:
   a workpiece-engaging member movable along a predetermined path and having a substantially flat abutment surface extending substantially perpendicular to said path;
   and a fluid spring for said member including a cylinder and a piston reciprocable in said cylinder, said piston having a piston rod extending from said cylinder toward said abutment surface generally perpendicular to the latter and terminating in an outer end disposed toward said abutment surface;
   a seat member separate from said workpiece-engaging member disposed between said outer end of the piston rod and said abutment surface and presenting a substantially flat end surface in confronting relationship to said abutment surface;
   and a thrust-sustaining joint between seat member and said outer end of the piston rod providing self-adjusting universal swivel movement between said seat member and the piston rod.

2. An apparatus according to claim 1, wherein said substantially flat end surface on the seat member has an area at least substantially as great as the cross-sectional area of the piston rod.

3. Apparatus according to claim 1, and further comprising yieldable means holding said seat member on said piston rod.

4. Apparatus according to claim 1, wherein said thrust-sustaining joint is a ball-and-socket joint.

5. Apparatus according to claim 4, wherein said piston rod presents an external shoulder near its outer end facing away from said seat member, and further comprising an annular retainer member of deformable and resilient material attached to said seat member and having an internal flange engaging said shoulder to detachable mount the seat member on the piston rod.

6. Apparatus according to claim 5, wherein said seat member has an external shoulder facing away from the piston rod, and said annular retainer member has an additional internal flange engaging said last-mentioned flange to detachably secure the retainer member to the seat member.

7. Apparatus according to claim 4, and further comprising a deformable and resilient annular retainer member holding said seat member frictionally against the outer end of the piston rod at said ball-and-socket joint, said retainer member normally positioning said seat member with its end surface substantially perpendicular to the axis of the cylinder and piston.

8. Apparatus according to claim 7, wherein said piston rod and said seat member each have an external circumferential groove therein adjacent said joint, and said retainer member has internal flanges snugly seated in said grooves and is stretched axially to hold said seat member frictionally against the outer end of the piston rod at said ball-and-socket joint, and said retainer member surrounds said joint to provide a seal therefor.

9. A fluid spring comprising:
   a cylinder and a piston reciprocable in said cylinder and having a piston rod extending beyond said cylinder;
   a seat member connected to the outer end of the piston rod outside the cylinder, said seat member presenting a substantially flat end surface facing away from said cylinder;
   and a thrust-sustaining joint between said seat member and said outer end of the piston rod which provides self-adjusting universal swivel movement between the seat member and the piston rod.

10. A fluid spring according to claim 9, wherein said substantially flat end surface on the seat member has an area at least substantially as great as the cross-sectional area of the piston rod.

11. A fluid spring according to claim 9, and further comprising yieldable means holding said seat member on said piston rod.

12. A fluid spring according to claim 9, wherein said thrust-sustaining joint is a ball-and-socket joint.

13. A fluid spring according to claim 12, wherein said piston rod presents an external shoulder near its outer end facing away from said seat member, and further comprising an annular retainer member of deformable and resilient material attached to said seat member and having an internal flange engaging said shoulder to detachably mount the seat member on the piston rod.

14. A fluid spring according to claim 13, wherein said seat member has an external shoulder facing away from the piston rod, and said annular retainer member has an additional internal flange engaging said last-mentioned flange to detachably secure the retainer member to the seat member.

15. Apparatus according to claim 12 and further comprising a deformable and resilient annular retainer member holding said seat member frictionally against the outer end of the piston rod at said ball-and-socket joint, said retainer member normally positioning said seat member with its end surface substantially perpendicular to the axis of the cylinder and piston.

16. Apparatus according to claim 15, wherein said piston rod and said seat member each have an external circumferential groove therein adjacent said joint, and said retainer member has internal flanges snugly seated in said grooves and is stretched axially to hold said seat member frictionally against the outer end of the piston rod at said ball-and-socket joint, and said retainer member surrounds said joint to provide a seal therefor.

References Cited

UNITED STATES PATENTS

| | | | |
|---|---|---|---|
| 2,970,853 | 2/1961 | Baker | 287—85 |
| 3,116,780 | 1/1964 | Bath | 72—297 |
| 3,135,539 | 6/1964 | Ulderup | 287—87 |
| 3,202,411 | 8/1965 | Heiser | 72—351 |
| 3,310,326 | 3/1967 | Melone | 287—87 |

CHARLES W. LANHAM, *Primary Examiner.*

K. C. DECKER, *Assistant Examiner.*

U.S. Cl. X.R.

72—350